(12) United States Patent
Li et al.

(10) Patent No.: US 11,544,324 B2
(45) Date of Patent: Jan. 3, 2023

(54) FILTER RECOMMENDATION BASED ON HISTORICAL SEARCH RESULT SELECTION

(71) Applicant: Oracle International Corporation, Redwood Shores, CA (US)

(72) Inventors: Garrick Li, Lynnwood, WA (US); Hillel Noah Cooperman, Seattle, WA (US); Kathleen Maguire Candland, San Francisco, CA (US); Rozita Naghshin, San Francisco, CA (US); Rohit Kumar Singh, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 131 days.

(21) Appl. No.: 17/181,453

(22) Filed: Feb. 22, 2021

(65) Prior Publication Data
US 2022/0269733 A1      Aug. 25, 2022

(51) Int. Cl.
*G06F 16/9535* (2019.01)
*G06F 16/9032* (2019.01)
*G06N 20/00* (2019.01)

(52) U.S. Cl.
CPC .... *G06F 16/90324* (2019.01); *G06F 16/9535* (2019.01); *G06N 20/00* (2019.01)

(58) Field of Classification Search
CPC ........... G06F 16/9032; G06F 16/90324; G06F 16/9532; G06F 16/9535
See application file for complete search history.

(56) References Cited

U.S. PATENT DOCUMENTS

| | | | |
|---|---|---|---|
| 2013/0226916 A1* | 8/2013 | Dredze | G06F 16/3322 707/723 |
| 2016/0063993 A1* | 3/2016 | Dolan | G06F 40/279 704/254 |
| 2017/0364596 A1* | 12/2017 | Wu | G06Q 50/01 |
| 2022/0100746 A1* | 3/2022 | Chen | G06K 9/6257 |

\* cited by examiner

*Primary Examiner* — Grace Park
(74) *Attorney, Agent, or Firm* — Invoke (57) ABSTRACT

Techniques for suggesting filters for query terms based on previously selected query results are disclosed. Common characteristics of previously selected query results are presented as a filter. A system trains a machine learning model by obtaining historical data including query characteristics and selected query results. Based on the historical data, the system trains the machine learning model to associate the first filter field with the first search term. The system receives a first query for execution. The system applies the machine learning model to the first query to identify the first filter field as a suggestion. The system: recommends the first field for filtering a first set of search results corresponding to the first query. Responsive to receiving user input selecting a first value for the first filter field, the system filters using the first value to generate a set of filtered search results, and presents the filtered search results.

20 Claims, 5 Drawing Sheets

FILTER RECOMMENDATION BASED ON HISTORICAL SEARCH RESULT SELECTION

TECHNICAL FIELD

The present disclosure relates to search and filtering systems. In particular, the present disclosure relates to a machine learning model for recommending filter fields and/or filter field values based on one or more characteristics of search results previously selected by a user.

BACKGROUND

Searching and filtering are typically the main ways to interact with a data corpus using a computer system. Searching and filtering are considered to be separate components within an experience. Generally, keyword search and faceted filtering achieve similar goals of reducing a number of information elements from within a corpus are visible to a user at a given time.

Faceted search is a technique which involves augmenting traditional search techniques with a faceted navigation system, allowing users to narrow down search results by applying multiple filters based on faceted classification. A faceted classification system classifies each information element along multiple explicit dimensions, called facets, enabling the classifications to be accessed and ordered in multiple ways rather than in a single, pre-determined, taxonomic order. Facets correspond to properties of the information elements within a corpus. Facets are often derived by analysis of the text of an item using entity extraction techniques or from pre-existing fields in a database such as author, descriptor, language, and format.

Keyword search allows a user to search a corpus for information elements that include a particular keyword or synonym thereof. A keyword is a particular word or phrase that describes the contents of an information item. A keyword can be a portion of text contained within a data item and/or metadata associated with the information item.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SEARCH AND FILTER SYSTEM
3. SUGGESTING A FILTER FIELD BASED ON PAST QUERY RESULT SELECTION CHARACTERISTICS
4. EXAMPLE EMBODIMENT
5. MISCELLANEOUS; EXTENSIONS
6. HARDWARE OVERVIEW

1. General Overview

One or more embodiments combine faceted filtering and keyword search within a single interface to allow for streamlined use of a searching and filtering system. The system uses machine learning to recommend at least one filter field for a user based on the user's prior selections within a set of search results. The recommended filter field may be selected from a defined candidate set of filter fields that are defined by an application or search engine, and available for user selection.

The system may recommend a filter field without a corresponding value for the filter field. The system accepts as additional input, a user-defined value for the system-recommended filter field. Alternatively or additionally, the system may recommend a filter field with a corresponding value for the filter field.

One or more embodiments suggest filter fields based on a user's previously selected search results. The system may suggest filter fields that allow a user to limit the search results to results corresponding to a particular characteristic that has been identified across multiple previously selected search results. For example, responsive to a user frequently selecting search results associated with the location "San Francisco," the system may suggest a filter field of "Location." The system may suggest the filter field without recommending a particular value for filter field "Location." Alternatively, the system may suggest a filter field value of "San Francisco" for the suggested filter field "Location". In another example, the system determines that the search results selected by a user in an online clothing store are most frequently a black, white, or blue color. The system suggests the filter field "color" to allow a user to specify the color. The user may, for example, specify one of black, white, or blue and filter out clothes of other colors.

One or more embodiments train a machine learning model based on historical data to suggest filter fields based both on query characteristics and previously selected search results. Each set of training data includes a prior query and one or more user-selected search results associated with the prior query. The machine learning model maps the characteristics of prior queries (for example, query category) to the characteristics of the user-selected search results. In an example, a first set of training data includes the query "restaurant" and selected search results that include different French restaurants. A second set of training data includes the query "shirt" and selected search results that include different blue shirts. Based on the training data, the machine learning model maps the query characteristic (restaurant query) to "French". Furthermore, the machine learning model maps the query characteristic (clothing query) to "blue". Thereafter, when the user searches for "pants", the machine learning model suggests a filter field of color with a filter value of blue. Furthermore, when the user searches for "restaurant", the machine learning model suggests a filter field of "cuisine" and a filter value of "French."

The system may receive additional user input confirming or modifying system-selected filter fields and/or system-selected filter field values. Based on the additional user input and the initial search term, the system executes a search and filtering operation on the data corpus of information items to determine a subset of the information items to present to the user.

One or more embodiments described in this Specification and/or recited in the claims may not be included in this General Overview section.

2. Search and Filter System

Figure 1:
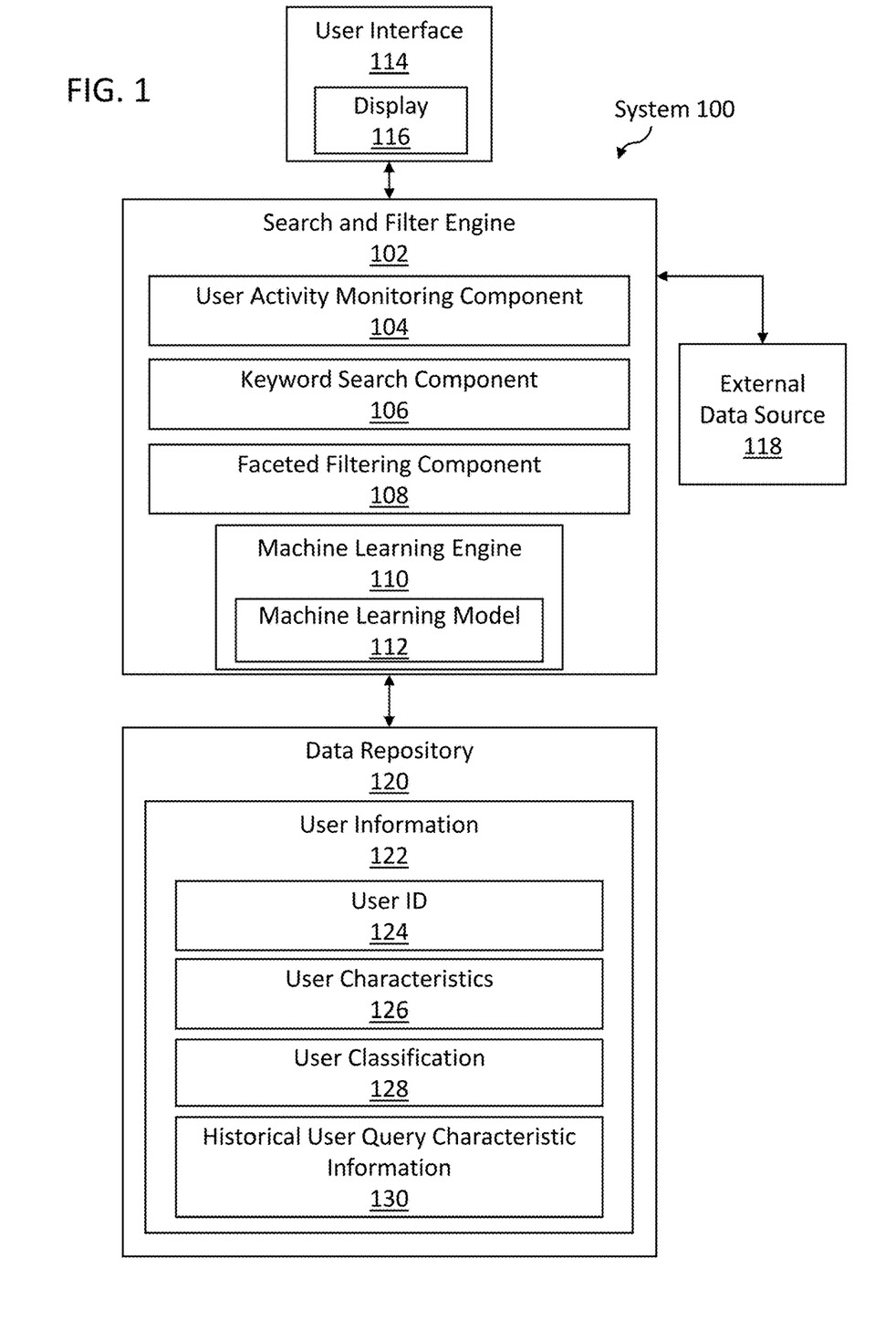
FIG. 1 illustrates a system for suggesting a filter field based on past query result selection characteristics in accordance with one or more embodiments.

FIG. 1 illustrates a system 100 in accordance with one or more embodiments. As illustrated in FIG. 1, system 100 includes a search and filter engine 102, a user interface 114, an external data source 118, a data repository 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 114 refers to hardware and/or software configured to facilitate communications between a user and the search and filter engine 102. The user interface 114 may be used by a user who accesses an interface (e.g., a dashboard interface) for work and/or personal activities. The user interface 114 may be associated with one or more devices for presenting visual media, such as a display 116, including a monitor, a television, a projector, and/or the like. User interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of the user interface 114 are specified in different languages. The behavior of user interface elements is specified in a runtime-generated programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 114 is specified in one or more other languages, such as Java, C, or C++.

In one or more embodiments, a search and filter engine 102 refers to hardware and/or software configured to perform operations described herein for performing faceted filtering and/or keyword searching operations based at least in part on input received from a user. Examples of operations for performing the faceted filtering and/or keyword searching are described below with reference to FIGS. 2 and 3.

In an embodiment, the search and filter engine 102 includes a user activity monitoring component 104. A user activity monitoring component 104 may refer to hardware and/or software configured to perform operations described herein (including such operations as may be incorporated by reference) for recognizing input from a user.

In an embodiment, the search and filter engine 102 includes keyword search component 106. The keyword search component 106 may refer to hardware and/or software configured to perform a keyword search on a corpus of data including a plurality of information elements.

In an embodiment, the search and filter component 102 includes a faceted filtering component 108. The faceted filtering component 108 may refer to hardware and/or software configured to perform faceted filtering operations on a corpus of data including a plurality of information elements.

In an embodiment, one or more components of the search and filter engine 102 use a machine learning engine 110. Machine learning includes various techniques in the field of artificial intelligence that deal with computer-implemented, user-independent processes for solving problems that have variable inputs.

In some embodiments, the machine learning engine 110 trains a machine learning model 112 to perform one or more operations. Training a machine learning model 112 uses training data to generate a function that, given one or more inputs to the machine learning model 112, computes a corresponding output. The output may correspond to a prediction based on prior machine learning. In an embodiment, the output includes a label, classification, and/or categorization assigned to the provided input(s). The machine learning model 112 corresponds to a learned model for performing the desired operation(s) (e.g., labeling, classifying, and/or categorizing inputs). The search and filter engine 102 may use multiple machine learning engines 110 and/or multiple machine learning models 112 for different purposes.

In an embodiment, the machine learning engine 110 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 110 receives positive and/or negative reinforcement in the process of attempting to solve a particular problem (e.g., to optimize performance in a particular scenario, according to one or more predefined performance criteria). In an embodiment, the machine learning engine 110 initially uses supervised learning to train the machine learning model 112 and then uses unsupervised learning to update the machine learning model 112 on an ongoing basis.

In an embodiment, a machine learning engine 110 may use many different techniques to label, classify, and/or categorize inputs. A machine learning engine 110 may transform inputs into feature vectors that describe one or more properties ("features") of the inputs. The machine learning engine 110 may label, classify, and/or categorize the inputs based on the feature vectors. Alternatively or additionally, a machine learning engine 110 may use clustering (also referred to as cluster analysis) to identify commonalities in the inputs. The machine learning engine 110 may group (i.e., cluster) the inputs based on those commonalities. The machine learning engine 110 may use hierarchical clustering, k-means clustering, and/or another clustering method or combination thereof. In an embodiment, a machine learning engine 110 includes an artificial neural network. An artificial neural network includes multiple nodes (also referred to as artificial neurons) and edges between nodes. Edges may be associated with corresponding weights that represent the strengths of connections between nodes, which the machine learning engine 110 adjusts as machine learning proceeds. Alternatively or additionally, a machine learning engine 110 may include a support vector machine. A support vector machine represents inputs as vectors. The machine learning engine 110 may label, classify, and/or categorizes inputs based on the vectors. Alternatively or additionally, the machine learning engine 110 may use a naïve Bayes classifier to label, classify, and/or categorize inputs. Alternatively or additionally, given a particular input, a machine learning model may apply a decision tree to predict an output for the given input. Alternatively or additionally, a machine learning engine 110 may apply fuzzy logic in situations where labeling, classifying, and/or categorizing an input among a fixed set of mutually exclusive options is impossible or impractical. The aforementioned machine learning model 112 and techniques are discussed for exemplary purposes only and should not be construed as limiting one or more embodiments.

For example, the machine learning engine 110 may receive, as inputs, user characteristic information and user input including a search term. The machine learning engine 110 may associate one or more filter fields with the input search term. Alternatively or additionally, the machine learning engine 110 may associate one or more filter fields with the received user characteristic information. In embodiments, the one or more filter fields associated with the user input or user characteristic information may be selected from a defined candidate set of filter fields that are defined by an application or search engine, and available for user selection.

In embodiments, the machine learning engine 110 may receive, as inputs, historical search and/or filter information indicating search and/or filter operations executed by one or more users including a user input term, a selected filter field, and a selected value associated with the filter field. The machine learning engine 110 may process the historical information to determine one or more patterns in associating filter fields and/or filter field values with user input and/or user characteristic information.

In an embodiment, as a machine learning engine 110 applies different inputs to a machine learning model 112, the corresponding outputs are not always accurate. As an example, the machine learning engine 110 may use supervised learning to train a machine learning model 112. After training the machine learning model 112, if a subsequent input is identical to an input that was included in labeled training data and the output is identical to the supervisory signal in the training data, then output is certain to be accurate. If an input is different from inputs that were included in labeled training data, then the machine learning engine 110 may generate a corresponding output that is inaccurate or of uncertain accuracy. In addition to producing a particular output for a given input, the machine learning engine 110 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the search and filter engine 102 is configured to receive data from one or more external data sources 118. An external data source 118 refers to hardware and/or software operating independent of the search and filter engine 102. For example, the hardware and/or software of the external data source 118 may be under control of a different entity (e.g., a different company or other kind of organization) than an entity that controls the search and filter engine.

In an embodiment, the search and filter engine 102 is configured to retrieve data from an external data source 118 by 'pulling' the data via an application programming interface (API) of the external data source 118, using user credentials that a user has provided for that particular external data source 118. Alternatively or additionally, an external data source 118 may be configured to 'push' data to the search and filter engine 102 via an API of the interface creation engine, using an access key, password, and/or other kind of credential that a user has supplied to the external data source 118. The search and filter engine 102 may be configured to receive data from an external data source 118 in many different ways.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the search and filter engine 102 and/or the external data source 118. Alternatively or additionally, a data repository 120 may be implemented or executed on a computing system separate from the search and filter engine 102 and/or the external data source 118. A data repository 120 may be communicatively coupled to the search and filter engine 102 and/or the external data source 118 via a direct connection or via a network.

User information 122 may be implemented across any of components within the system 100. However, this information is illustrated within the data repository 120 for purposes of clarity and explanation. As illustrated in FIG. 1, the user information 122 may comprise a user identifier (e.g., a used ID) 124, one or more user characteristics 126, a user classification 128, and historical query information 130 associated with the user. In embodiments, the user information 122 includes more fields, fewer fields, or different fields.

The user identifier 124 may be a character string that uniquely identifies exactly one user. The user characteristics 126 may comprise one or more characteristics of a user. As examples, the user characteristics may include features such as user age, user location, employee start date, preferred contact methods, etc. The user classification 128 may comprise one or more groups to which a user belongs. As examples, the classification may be by user seniority (e.g., new employees, senior employees, etc.), by functional group (e.g., human resources employees, marketing employees, accounting employees, etc.), and/or any other classification. The historical query information 130 may comprise a log or other data structure that includes input (e.g., a keyword) the user has previously submitted, one or more filter fields previously selected by the user, and/or one or more filter field values selected by the user. In some embodiments the historical query information 130 may store all queries submitted by a user. Alternatively, in some embodiments the historical query information 130 may be limited to a predefined number of queries (e.g., the 100 most recently submitted queries) and/or a particular time period (e.g., queries submitted in the preceding six months). In one or more embodiments, the historical query information may further comprise time information (e.g., date and time) related to when each stored query was submitted.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
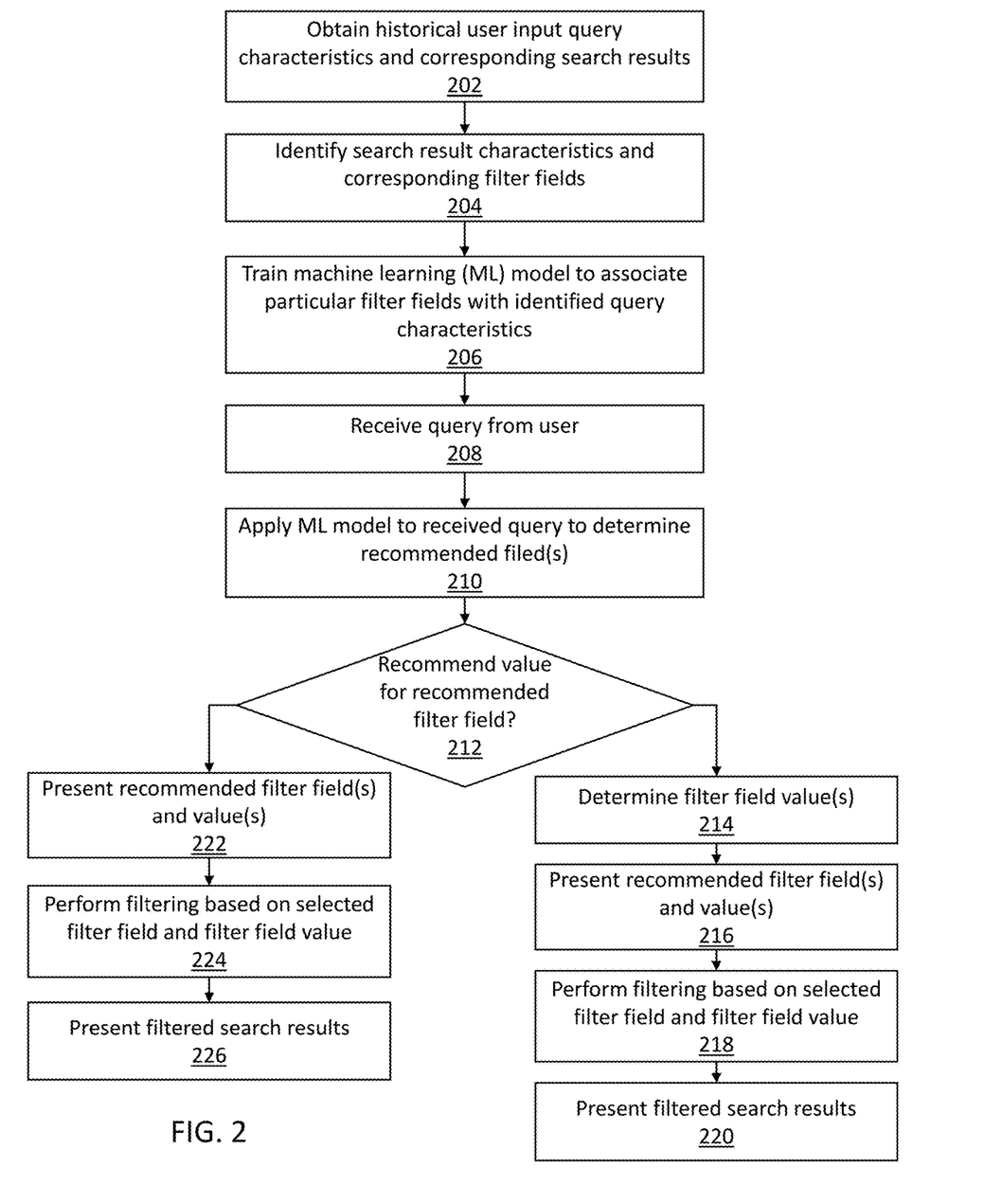
FIG. 2 illustrates an example set of operations for suggesting a filter field based on past query result selection characteristics in accordance with one or more embodiments.

3. Suggesting a Filter Field Based on Past Query Result Selection Characteristics FIG. 2 illustrates an example set of operations for suggesting a filer field based on past query and result selection characteristics. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments obtain historical query data and associated result selection data (Operation 202). The historical data obtained may include historical query data and query characteristic data associated with the historical query data. As an example, a use may search for clothing using queries such as "shirt," "pants," "suit," and/or "dress." The query characteristic data associated with such queries may include, for example, the term "clothing." Query characteristic data may be derived from natural language processing and/or synonym analysis to determine characteristic information.

The system may also obtain result selection data associated with the historical query data. The obtained result selection data may indicate a set of query results selected by a user in response to a particular query. The set of selected query results for a particular query may include zero results, a single result, or multiple results. For example, given the queries above, the result selection data may include the clothing items (e.g., shirt, pants, suite, and/or dress) selected by a user. Selection by a user may include, for example, the user viewing the item and/or the user purchasing the item.

In embodiments, the historical query data and the result selection data may include data from only one particular user (e.g., a current user). Alternatively, the historical query data and the result selection data may include data from multiple users that exceed a similarity threshold with the current user (e.g., all users of a particular category, classification, or job function, all users from a particular location), or may include all users of a system. Determining that a user exceeds a similarity threshold with the current user may include determining that one or more user characteristics associated with the user substantially match one or more user characteristics associated with the current user.

The system may determine or otherwise identify one or more selected result characteristics and corresponding filter fields (Operation 204). Identifying characteristics of the search result may include analysis of the obtained result selection data (e.g., in Operation 202) to determine one or more characteristics of each particular selected query result. The system may perform grouping or other analysis to determine groupings having one or more common characteristics. For example, given the example queries and results discussed above, the system determine that the clothing items selected by the user are typically black in color.

The system may train one or more machine learning (ML) models to associate query characteristics with one or more particular filter fields and/or one or more filter field values corresponding to the identified selected result characteristics (Operation 206). That is, given the example data above, responsive to a user frequently selecting clothes that are black, the system may associate the searches with a filter field "Color;" the system may further the searches with a filter field value of "Black" corresponding to the filter field.

In some embodiments, the system may train a ML model to associate the query characteristics with one or more filter fields, while refraining from associating the query characteristics with filter field values. In some embodiments, the system may train a single ML model to associate the query characteristics with one or more particular filter fields and one or more filter field values. Alternatively, the system may train a first ML model to associate the query characteristics with one or more particular filter fields and a second ML model to associate the query characteristics with one or more particular filter field values. In embodiments, the one or more filter fields associated with the query characteristics are selected from a defined candidate set of filter fields that are defined by an application or search engine, and available for user selection. In embodiments, the one or more filter field values associated with the query characteristics are selected from a defined candidate set of filter field values that are defined by an application or search engine, and available for user selection. For example, a candidate set of filter field values may be defined for each candidate filter field.

The system may receive a query as input from a user (Operation 208). The input query may include typed characters from a physical or virtual keyboard, voice input received via a microphone, and/or selection of inputs using another input device (e.g., selection of options using a mouse, touchscreen, etc.). In embodiments, the received input query may be associated with one or more query characteristics.

The system may apply the trained a trained ML model (e.g., a first ML model) to the received input to determine a set of recommended filter fields (Operation 210). Applying the trained ML model to the user input includes determining the one or more characteristics associated with the input query and using the determined characteristics of the input query as an input to the trained ML model and receiving, as output, an identification of a set filter fields associated with the user input. In embodiments, the set of filter fields identified by the ML model may be selected from a defined candidate set of filter fields that are defined by an application or search engine, and available for user selection.

For each filter field in the set of filter fields identified by applying the trained ML model to the user input, the system may determine whether to recommend a filter field value associated with the filter field (Operation 212). In embodiments, the system may determine whether to recommend a filter field value associated with the filter field based at least in part on whether a ML model associates a filter field value with the user input. Additionally or alternatively, the ML model may associate the filter field value with one or more user characteristics of a user that provided the user input and/or one or previously selected search results of the user that provided the user input.

In response to determining that the system should recommend a filter field value for the filter field (YES in Operation 212), the system may determine a set of recommended filter field values (Operation 214). Determining a set of recommended filter field values may include determining, for the filter field, a set of one or more values that may be applied to a filter field. In embodiments, the set of recommended filter field values may be selected from among the set of one or more values that may be applied to the filter field. The set of recommended filter field values may be determined by applying a ML model to the query characteristics of the input query to determine one or more filter field values (e.g., from the set of filter field values that may be applied to the filter field) associated with the user input. Alternatively or additionally, the set of recommended filter field values may be determined by applying a ML model to user characteristics and/or previously selected filter fields and/or filter field values to determine one or more filter field values (e.g., from the set of filter field values that may be applied to the filter field). In some embodiments, the set of recommended filter field values may be determined based on one or more user characteristics and/or one or more information items in the corpus.

In some embodiments, determining the set of recommended filter field values may be performed in the same operation as determining the set of recommended filter fields (e.g., Operation 210). For example, a single ML model may be used to determine both the set of recommended filter fields and the set of recommended filter field values. Alternatively, the system may determine the set of recommended filter field values subsequent to determining the set of recommended filter fields, and may determine the set of recommended filter field values based at least in part on the set of recommended filter fields. The system may use a first ML model to determine the set of recommended filter fields and a second ML model to determine the set of filter field values.

The system may present the set of recommended filter fields and the associated sets of recommended filter field values to the user as candidates for approval by the user (Operation 216). In embodiments, presenting the set of recommended filter fields and the associated sets of recommended filter field values may include displaying the set of recommended filter fields and the associated sets of recommended filter field values on a monitor or other display device, creating a log file that includes the set of recommended filter fields and the associated sets of recommended filter field values, and/or transmitting a message (e.g., an email) that includes the set of recommended filter fields and the associated sets of recommended filter field values. The system can present the set of recommended filter fields and the associated sets of recommended filter field values in many different ways.

In embodiments, presenting the set of recommended filter fields and the associated sets of recommended filter field values may include associating each filter field in the set of recommended filter fields with an icon. The icon may be a graphical representation of the filter field. As particular examples, a global positioning system (GPS)-style pointer graphic may be used as an icon for a location filter, a clock graphic may be used as an icon for a duration filter. The graphic icon may be useful in conveying the filter meaning to a user, as well as in indicating that the suggestion represents a filter field.

The system may receive a selection of at least a selected filter field and a selected filter field value. Selection of a filter field may be performed by the user clicking or otherwise activating a particular filter field. Alternatively, the selection may be received by the user entering text associated with the particular filter field. The user may select more than one filter field from among the set of recommended filter fields. The user may select the particular filter field from among the presented set of recommended filter fields. Additionally or alternatively, selecting the filter field may include selecting a filter field that is not included in the set of recommended filter fields. That is, a user may enter text associated with a filter field that is not one of the filter fields recommended by the system to select such a filter field.

For each particular filter field selected, the user may select a particular filter field value. Selection of a filter field value may be performed by the user clicking or otherwise activating a particular filter field value. Alternatively, the selection may be received by the user entering text associated with the particular filter field value. The user may select more than one filter field value from among the set of recommended filter field values associated with a particular filter field. The user may select the particular filter field value from among the presented set of recommended filter field values. Additionally or alternatively, selecting the filter field value may include selecting a filter field value that is not included in the set of recommended filter field values. That is, a user may enter text associated with a filter field value that is not one of the filter field values recommended by the system to select such a field.

The system may perform a filtering operation based on the selected filter field and selected filter field value (Operation 218). Performing the filtering operation may include selecting, from the corpus of information items, a subset of information items that include the filter field and filter field value.

The system may present filtered search results (Operation 220). Presenting the filtered search results may include presenting the selected subset of information items from the corpus. In embodiments, presenting the selected subset can include displaying the selected subset on a monitor or other display device, creating a log file that includes the selected subset, and/or transmitting a message (e.g., an email) that includes selected subset. The system can present the results in many different ways.

Alternatively, in response to determining that the system should recommend a filter field value for the filter field (NO in Operation 212), the system may present the set of recommended filter fields to the user as candidates for approval by the user (Operation 222). The system may present the set of recommended filter fields without recommending a corresponding value for at least one particular filter field from among the set of recommended filter fields. In embodiments, presenting the set of recommended filter fields may include displaying the set of recommended filter fields on a monitor or other display device, creating a log file that includes the set of recommended filter fields, and/or transmitting a message (e.g., an email) that includes the set of recommended filter fields. The system can present the set of recommended filter fields in many different ways.

In embodiments, presenting the set of recommended filter fields may include associating each filter field in the set of recommended filter fields with an icon. The icon may be a graphical representation of the filter field. As particular examples, a global positioning system (GPS)-style pointer graphic may be used as an icon for a location filter, a clock graphic may be used as an icon for a duration filter. The graphical icon may be useful in conveying the filter meaning to a user, as well as in indicating that the suggestion represents a filter field.

The system may receive a selection of at least a selected filter field and a selected filter field value. Selection of a filter field may be performed by the user clicking or otherwise activating a particular filter field. Alternatively, the selection may be received by the user entering text associated with the particular filter field. The user may select more than one filter field from among the set of recommended filter fields. The user may select the particular filter field from among the presented set of recommended filter fields. Additionally or alternatively, selecting the filter field may include selecting a filter field that is not included in the set of recommended filter fields. That is, a user may enter text associated with a filter field that is not one of the filter fields recommended by the system to select such a filter field.

For each particular filter field selected, the user may select a particular filter field value. Selection of a filter field value may be performed by the user entering text associated with the particular filter field value. The user may select more than one filter field value from among the set of filter field values associated with a particular filter field.

The system may perform a filtering operation based on the selected filter field and selected filter field value (Operation 224). Performing the filtering operation may include selecting, from the corpus of information items, a subset of information items that include the filter field and filter field value.

The system may present filtered search results (Operation 226). Presenting the filtered search results may include presenting the selected subset of information items from the corpus. In embodiments, presenting the selected subset can include displaying the selected subset on a monitor or other display device, creating a log file that includes the selected subset, and/or transmitting a message (e.g., an email) that includes selected subset. The system can present the results in many different ways.

In embodiments, this process can be applied iteratively to receive multiple user inputs, filtering and/or search the corpus additionally based on each of the user inputs.

In embodiments, after a subset of the corpus has been identified (e.g., based on a filtering and/or keyword search operation), the system determines one or more candidate filter fields to suggest to a user for application to the subset of the corpus. The one or more candidate filter fields may be selected based at least in part on the subset of information items.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
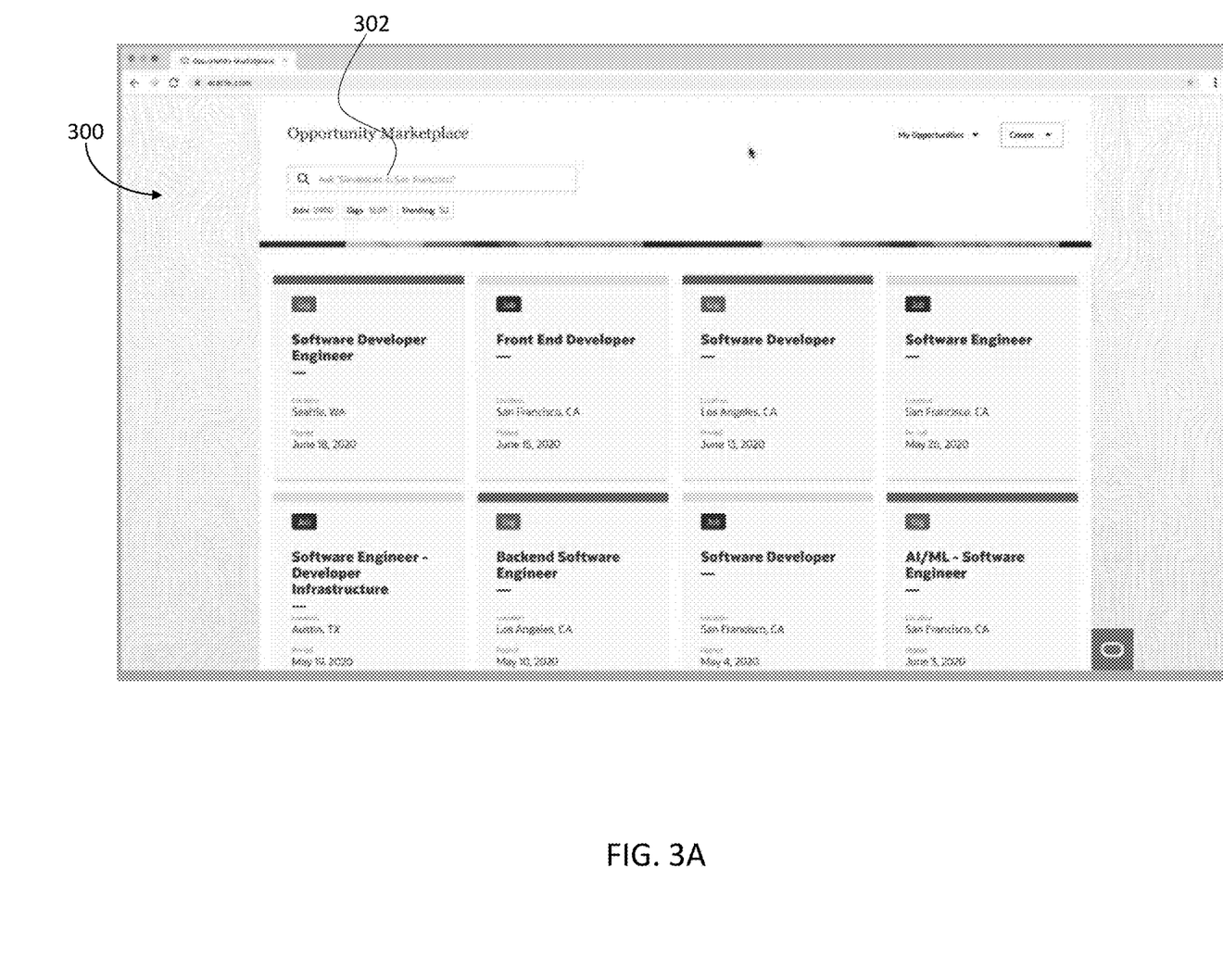
FIGS. 3A and 3B show an example of a suggesting a filter field based on past query result selection characteristics in accordance with one or more embodiments.

FIG. 3A shows an example dashboard 300 for a career opportunity site including an input field 302 for a search and filter engine that performs keyword search and faceted filter operations. The dashboard 300 is configured to suggest filter fields based on user characteristics.

Figure 3B:
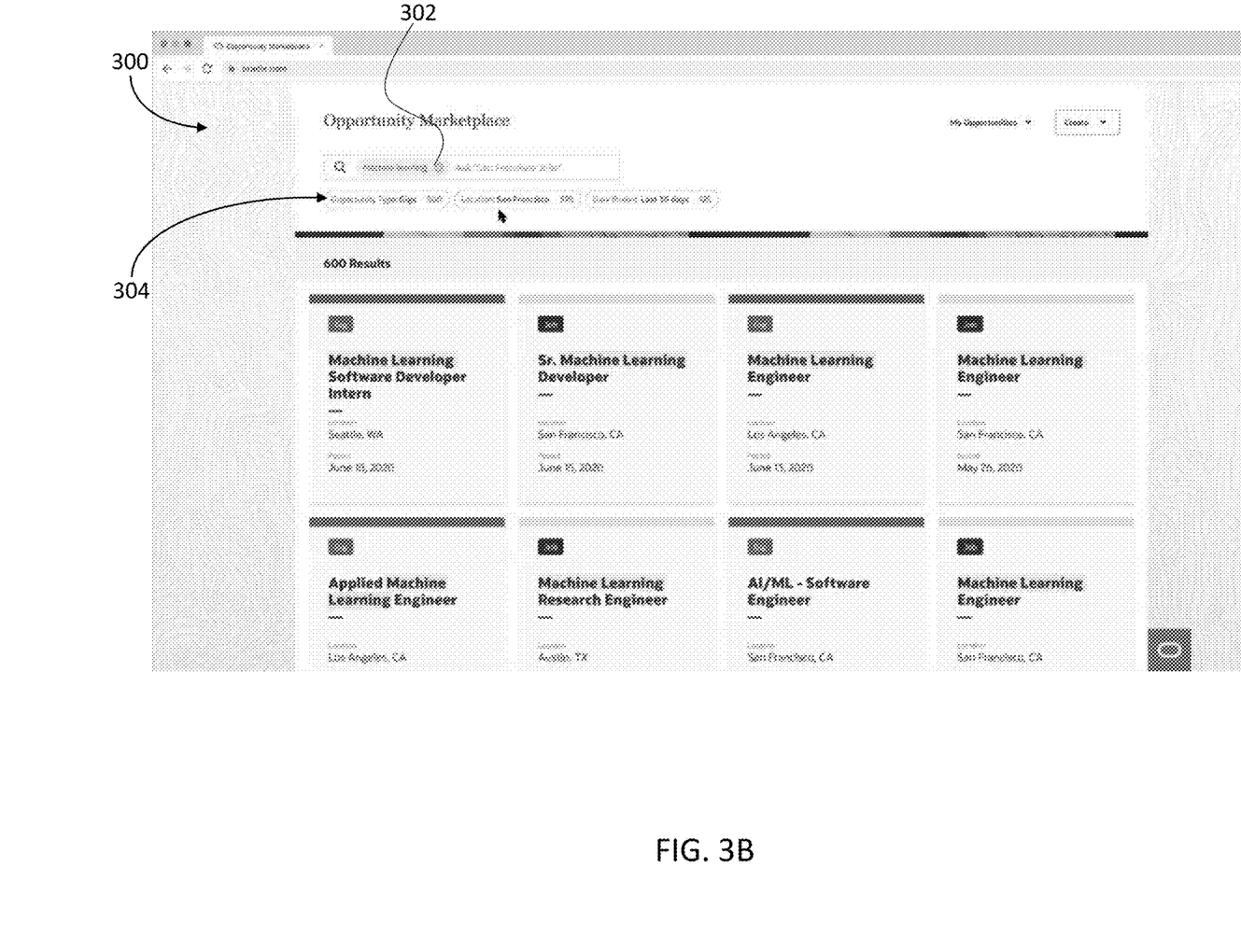

As shown in FIG. 3B, the user provides a search/filter input including the words "machine learning" in the input field 302. Based on previous searches executed by the suer, the system determines that searching for opportunities in the machine learning field, the user has selected results related to gig or contract work, that the user has selected opportunities located within the city of San Francisco, and that the user has selected opportunities posted within the last 30 days. Accordingly, the system presents, as filter fields 304 with corresponding filter field values a first suggested filter field "Opportunity Type" associated with the filter field value "Gigs," a second suggested filter field "Location" associated with the filter field value "San Francisco," and a third suggested filter field "Date Posted" associated with the filter field value "Last 30 Days," The system determines that the user input is not associated with any filter field. Accordingly, the system indicates performance a keyword search based on the user input, and suggests search terms 406. The performance of a keyword search is indicated by the magnifying glass graphic icon next to the search terms 406. In particular, the system suggests the input entered by the user (e.g., "machine learning") and additional search terms based on the input entered by the user.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
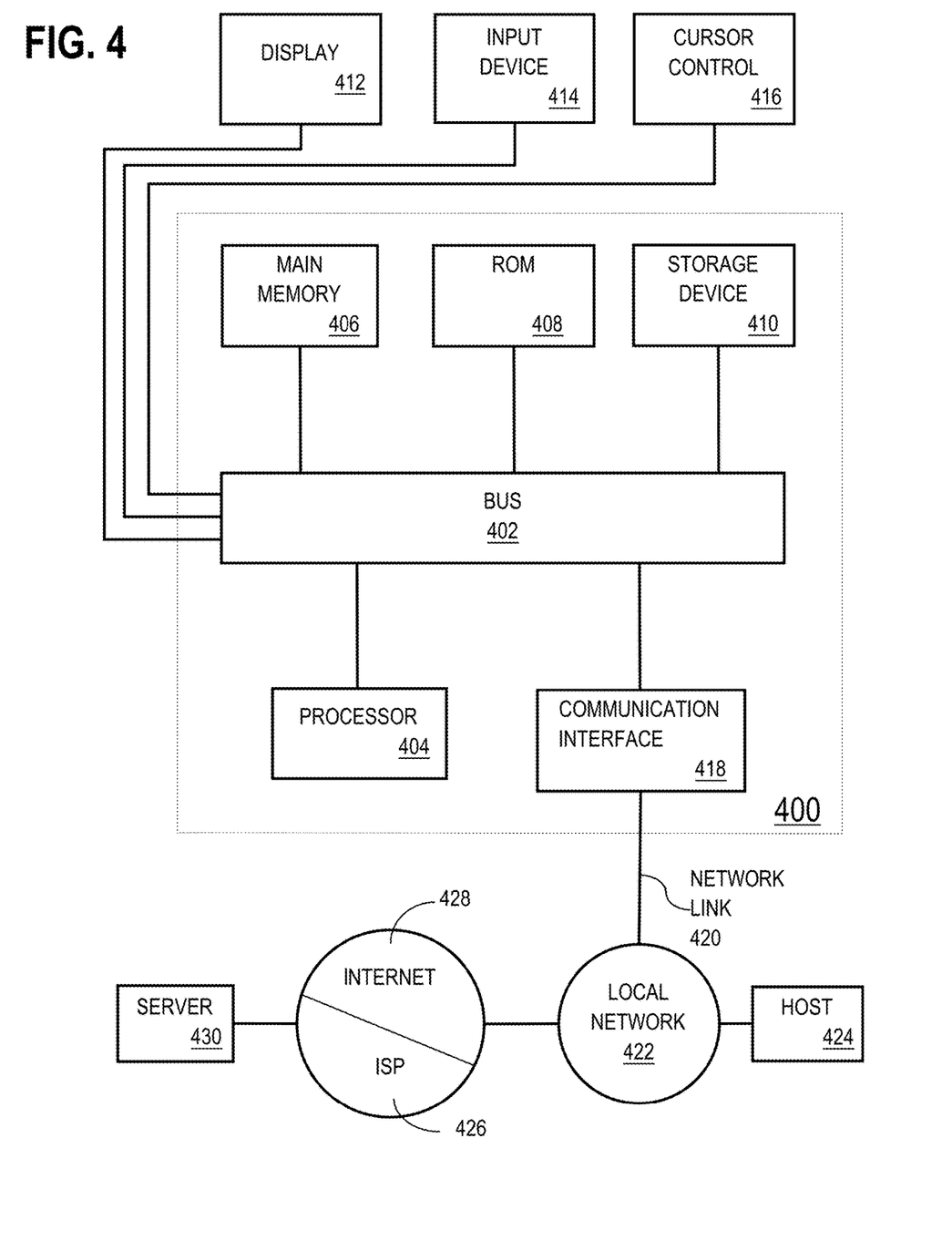
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other runtime-generated storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes runtime-generated memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its runtime-generated memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, causing execution of operations comprising:
   training a machine learning model to suggest filtering fields for executing a query at least by:
      obtaining sets of historical data, each set of historical data comprising (a) query characteristics corresponding to a corresponding query, and (b) a search result selected from a plurality of search results corresponding to the query;
      identifying a search result characteristic that is common across selected search results for queries associated with a same particular set of query characteristics;
      identifying a first filter field, of a plurality of available filter fields, that includes functionality to select a subset of search results corresponding to the search result characteristic;
      training the machine learning model (a) to associate the first filter field with the particular set of query characteristics without (b) associating a second filter field, of the plurality of available filter fields, with the particular set of query characteristics;
   receiving a first query for execution;
   determining that the first query is associated with particular set of query characteristics;
   applying the machine learning model to the particular set of query characteristics associated with the first query, wherein the machine learning model identifies the first filter field a suggestion without identifying the second filter field as a suggestion;
   based on the applying operation: recommending the first field for filtering a first set of search results corresponding to the first query without recommending the second filter field;
   receiving user input selecting a first value for the first filter field;
   filtering the first set of search results corresponding to the first query based on the first value for the first filter field to generate a filtered set of search results;
   presenting the filtered set of search results.

2. The media of claim 1, wherein the particular set of query characteristics comprises characteristics of a query requestor.

3. The media of claim 1, wherein the particular set of query characteristics comprises a query term.

4. The media of claim 1, wherein the sets of historical data are associated with queries from a single user.

5. The media of claim 1, the operations further comprising recommending a candidate filter value as the first value for the first filter field based on the sets of historical data.

6. The media of claim 1, the operations further comprising:
   subsequent to identifying the first filter field as a suggestion, determining the first value as a suggestion, wherein the first value is a filter field value determined at least in part based on the identified first filter field;
   wherein recommending the first field for filtering the first set of search results corresponding to the first query further comprises recommending the first value.

7. The media of claim 1, wherein training the machine learning model comprises training the machine learning model to associate the first value for the first filter field with the first search term, and wherein the recommending the first filter field comprises recommending the first value for the first filter field for filtering the first set of search results.

8. The media of claim 1, the operations further comprising:
   recommending a candidate filter value as the first value for the first filter field;
   wherein the particular set of query characteristics comprises characteristics of one or more of: (a) a query requestor or (b) a query term;
   wherein the sets of historical data are associated with queries from a single user.

9. A method comprising:
   training a machine learning model to suggest filtering fields for executing a query at least by:
      obtaining sets of historical data, each set of historical data comprising (a) query characteristics corresponding to a corresponding query, and (b) a search result selected from a plurality of search results corresponding to the query;
      identifying a search result characteristic that is common across selected search results for queries associated with a same particular set of query characteristics;
      identifying a first filter field, of a plurality of available filter fields, that includes functionality to select a subset of search results corresponding to the search result characteristic;
      training the machine learning model (a) to associate the first filter field with the particular set of query characteristics without (b) associating a second filter field, of the plurality of available filter fields, with the particular set of query characteristics;
   receiving a first query for execution;
   determining that the first query is associated with particular set of query characteristics;
   applying the machine learning model to the particular set of query characteristics associated with the first query, wherein the machine learning model identifies the first filter field a suggestion without identifying the second filter field as a suggestion;
   based on the applying operation: recommending the first field for filtering a first set of search results corresponding to the first query without recommending the second filter field;
   receiving user input selecting a first value for the first filter field;
   filtering the first set of search results corresponding to the first query based on the first value for the first filter field to generate a filtered set of search results;
   presenting the filtered set of search results,
   wherein the method is performed by at least one device including a hardware processor.

10. The method of claim 9, wherein the particular set of query characteristics comprises characteristics of a query requestor.

11. The method of claim 9, wherein the particular set of query characteristics comprises a query term.

12. The method of claim 9, wherein the sets of historical data are associated with queries from a single user.

13. The method of claim 9, further comprising recommending a candidate filter value as the first value for the first filter field based on the sets of historical data.

14. The method of claim 9, further comprising:
   subsequent to identifying the first filter field as a suggestion, determining the first value as a suggestion, wherein the first value is a filter field value determined at least in part based on the identified first filter field;
   wherein recommending the first field for filtering the first set of search results corresponding to the first query further comprises recommending the first value.

15. The method of claim 9, wherein training the machine learning model comprises training the machine learning model to associate the first value for the first filter field with the first search term, and wherein the recommending the first filter field comprises recommending the first value for the first filter field for filtering the first set of search results.

16. A system comprising:
   at least one device including a hardware processor;
   the system being configured to perform operations comprising:
      training a machine learning model to suggest filtering fields for executing a query at least by:
         obtaining sets of historical data, each set of historical data comprising (a) query characteristics corresponding to a corresponding query, and (b) a search result selected from a plurality of search results corresponding to the query;
         identifying a search result characteristic that is common across selected search results for queries associated with a same particular set of query characteristics;
         identifying a first filter field, of a plurality of available filter fields, that includes functionality to select a subset of search results corresponding to the search result characteristic;
         training the machine learning model (a) to associate the first filter field with the particular set of query characteristics without (b) associating a second filter field, of the plurality of available filter fields, with the particular set of query characteristics;
      receiving a first query for execution;
      determining that the first query is associated with particular set of query characteristics;
      applying the machine learning model to the particular set of query characteristics associated with the first query, wherein the machine learning model identifies the first filter field a suggestion without identifying the second filter field as a suggestion;
      based on the applying operation: recommending the first field for filtering a first set of search results corresponding to the first query without recommending the second filter field;
      receiving user input selecting a first value for the first filter field;
      filtering the first set of search results corresponding to the first query based on the first value for the first filter field to generate a filtered set of search results;
      presenting the filtered set of search results.

17. The system of claim 16, the operations further comprising recommending a candidate filter value as the first value for the first filter field based on the sets of historical data.

18. The system of claim 16, the operations further comprising:
   subsequent to identifying the first filter field as a suggestion, determining the first value as a suggestion, wherein the first value is a filter field value determined at least in part based on the identified first filter field;
   wherein recommending the first field for filtering the first set of search results corresponding to the first query further comprises recommending the first value.

19. The system of claim 16, wherein the particular set of query characteristics comprises characteristics of a query requestor.

20. The system of claim 16, wherein the particular set of query characteristics comprises a query term.

* * * * *